United States Patent
McCarthy et al.

(10) Patent No.: US 9,207,128 B2
(45) Date of Patent: Dec. 8, 2015

(54) DYNAMIC FIBER TEMPERATURE SENSING PACKAGE AND METHOD OF ASSEMBLING THE SAME

(75) Inventors: Kevin McCarthy, Troy, NY (US); Hua Xia, Niskayuna, NY (US); Juntao Wu, Niskayuna, NY (US); Axel Busboom, Munich (DE); Thomas Finucane, Roanoke, VA (US)

(73) Assignee: General Electric Company, Niskayuna, NY (US)

( * ) Notice: Subject to any disclaimer, the term of this patent is extended or adjusted under 35 U.S.C. 154(b) by 734 days.

(21) Appl. No.: 13/489,129

(22) Filed: Jun. 5, 2012

(65) Prior Publication Data
US 2013/0323023 A1    Dec. 5, 2013

(51) Int. Cl.
| F01D 17/02 | (2006.01) |
| G01K 1/14 | (2006.01) |
| G01K 11/32 | (2006.01) |
| G01K 13/02 | (2006.01) |

(52) U.S. Cl.
CPC .............. *G01K 1/14* (2013.01); *G01K 11/3206* (2013.01); *G01K 13/02* (2013.01); *F05D 2270/303* (2013.01); *F05D 2270/80* (2013.01); *G01K 2013/024* (2013.01); *Y10T 29/49117* (2015.01)

(58) Field of Classification Search
CPC .............. G01K 11/32; G01K 11/3206; G01K 11/3213; G01K 13/02; F05D 2270/804; F05D 2270/80; F01D 17/02
USPC .............. 415/118; 374/161, E11.015
See application file for complete search history.

(56) References Cited

U.S. PATENT DOCUMENTS

| 2,946,221 | A | * | 7/1960 | Annear et al. ............. 73/861.65 |
| 4,161,101 | A |   | 7/1979 | Drummond |
| 4,765,751 | A | * | 8/1988 | Pannone et al. ............... 374/143 |
| 5,226,731 | A |   | 7/1993 | Allen |
| 5,499,313 | A |   | 3/1996 | Kleinerman |
| 6,595,062 | B1 | * | 7/2003 | Luke et al. ...................... 73/714 |
| 6,923,048 | B2 | * | 8/2005 | Willsch et al. ............. 73/112.01 |
| 6,978,074 | B2 |   | 12/2005 | Shu et al. |
| 7,056,085 | B2 | * | 6/2006 | Ponziani ........................ 415/118 |
| 7,327,472 | B2 |   | 2/2008 | Riza et al. |
| 7,379,169 | B1 |   | 5/2008 | Kraemer et al. |
| 7,912,334 | B2 |   | 3/2011 | Xia et al. |
| 8,135,247 | B2 |   | 3/2012 | Xia et al. |
| 8,965,728 | B2 | * | 2/2015 | Snider et al. .................. 702/130 |
| 2008/0084913 | A1 | * | 4/2008 | Perales et al. ................. 374/131 |
| 2008/0095612 | A1 | * | 4/2008 | Girbig et al. .................. 415/118 |
| 2010/0290733 | A1 | * | 11/2010 | Xia et al. ......................... 385/12 |

\* cited by examiner

*Primary Examiner* — Ninh H Nguyen
(74) *Attorney, Agent, or Firm* — Ann M. Agosti

(57) ABSTRACT

A dynamic fiber temperature sensing package is provided herein. The sensing package includes a support structure, a holder coupled to the support structure, a sheath coupled to the support structure via the holder, and a fiber optic temperature sensor positioned within the sheath. The holder includes a material having a first thermal conductivity and the sheath includes a material having a second thermal conductivity, wherein the second thermal conductivity is greater than the first thermal conductivity.

17 Claims, 2 Drawing Sheets

DYNAMIC FIBER TEMPERATURE SENSING PACKAGE AND METHOD OF ASSEMBLING THE SAME

BACKGROUND OF THE INVENTION

The field of the present disclosure relates generally to turbine engines and, more specifically to a sensor package with improved dynamic temperature measurement capabilities.

Rotary machines, such as gas turbines and steam turbines, are used to generate power for electric generators. Gas turbines, for example, have a gas path which typically includes, in serial-flow relationship, an air intake (or inlet), a compressor, a combustor, a turbine, and a gas outlet (or exhaust nozzle). Compressor and turbine sections include at least one row of circumferentially spaced rotating buckets or blades positioned within a package house. During operation, at least some known turbine assemblies include components that monitor the temperature of fluid flowing through a high temperature gas path of the assembly. As used herein, dynamic temperature refers to a measure of a change in temperature due to flow variation. Measuring dynamic temperature is useful for determining temperature profiles within a turbine assembly, which is effective for facilitating thermal stress management to extend the lifetime of hot gas path components and for providing a way to monitor can-to-can combustion dynamics, fuel flexibility, and turbine control.

At least some known turbine assemblies use thermocouples to measure dynamic temperature. However, known thermocouples must be heavily packaged to survive hot gas path environments with fluid flowing therethrough at high rates. As such, heavily packaging the thermocouple adversely affects its maximum thermal response rate. Furthermore, known thermocouples are susceptible to hydrogen embrittlement such that the thermocouple packaging may crack when subjected to high temperature environments. At least some known fiber optic sensors have a higher thermal response rate when compared to known thermocouples and the fiber optic sensors may be packaged for survival in harsh environments. However, these known fiber optic sensor packages have undesirable flow sensitivity properties for measuring dynamic temperature.

BRIEF DESCRIPTION OF THE INVENTION

In one aspect, a dynamic fiber temperature sensing package is provided. The sensor package includes a support structure, a holder coupled to the support structure, a sheath coupled to the support structure via the holder, and a fiber optic temperature sensor positioned within the sheath. The holder includes a material having a first thermal conductivity and the sheath includes a material having a second thermal conductivity, wherein the second thermal conductivity is greater than the first thermal conductivity.

In another aspect, a method of assembling a sensor system is provided. The method includes coupling a holder to a support structure, positioning a fiber optic temperature sensor within a sheath, and coupling the sheath to the support structure via the holder. The holder includes a material having a first thermal conductivity and the sheath includes a material having a second thermal conductivity, wherein the second thermal conductivity is greater than the first thermal conductivity.

In yet another aspect, a turbine assembly is provided. The turbine assembly includes a turbine including a flow path and a shell. A support structure extends substantially into the flow path and a holder is coupled to the support structure. A sheath is coupled to the support structure via the holder and a fiber optic temperature sensor is positioned with the sheath. The holder includes a material having a first thermal conductivity and the sheath includes a material having a second thermal conductivity, wherein the second thermal conductivity is greater than the first thermal conductivity.

DETAILED DESCRIPTION OF THE INVENTION

Figure 1:
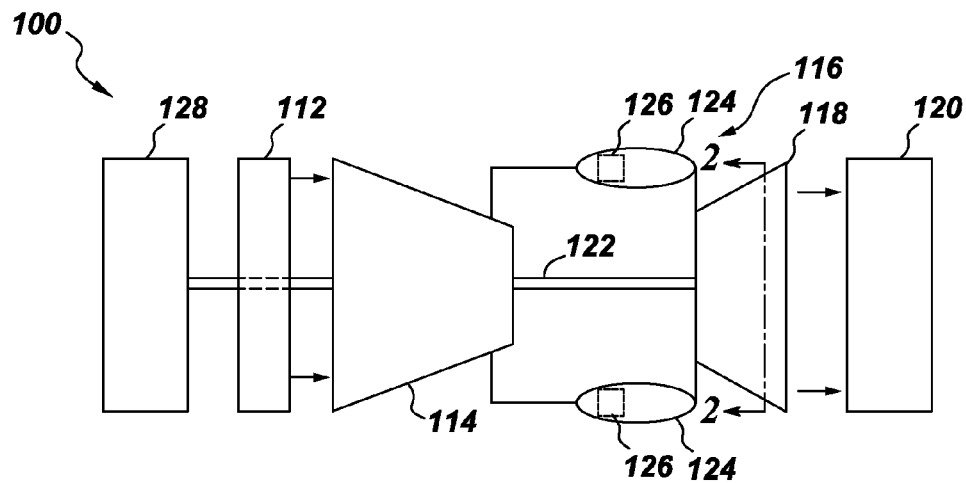
FIG. 1 is a schematic view of an exemplary turbine engine.

Embodiments of the present disclosure are directed to turbine assemblies and, more specifically to a sensor package for measuring dynamic temperature within a turbine. Even more specifically, embodiments of the present disclosure are directed to a low-mass dynamic fiber temperature sensing package having a higher thermal response rate when compared to known thermocouple systems. Furthermore, the package is designed to withstand drag forces induced by fluid flowing through a turbine assembly and provide an increased number of measurement points for more accurately determining average temperature within the turbine assembly. Furthermore, providing an increased number of measurement points facilitates enabling the tracking of harmful thermal anomalies within the turbine assembly.

Fiber optic sensors determine dynamic temperature using a combination of the thermo-optic effect and thermal expansion effect. Dynamic temperature measurements are obtained by determining the wavelength shift using the following equation:

$$\Delta\lambda(t)=\lambda_B(\alpha_f+\beta)\cdot\Delta T=\kappa\cdot[T(t)-T(0)]$$

where $\kappa$ is fiber sensor temperature sensitivity, $\Delta\lambda$ is wavelength shift, $\lambda_B$ is the Bragg wavelength, $\alpha_f$ and $\beta$ are coefficients of thermal expansion and thermo-optic coefficient of fiber material, $T(t)$ is the temperature at a given time, and $T(0)$ is a starting temperature. As temperature varies with respect to time, the resulting wavelength shift may be used to measure dynamic temperature, which may be proportional to the square of gas flow velocity and inversely proportional to gas specific heat.

However, bare fiber optic sensors are unable to survive in harsh turbine environments. As such, in the exemplary embodiments of the present disclosure, the package described herein includes a low-heat conductive holding tube coupled to an exhaust temperature rake positioned within a turbine engine, a high-heat conductive sheath inserted through the holding tube, and a fiber optic temperature sensor positioned within the high-heat conductive sheath. More specifically, in one embodiment, the exhaust temperature rake is positioned within the exhaust flow path of a gas turbine engine such that the sensor package position is physically stabilized within the flow path. The holding tube is constructed of a low-heat conductive material that facilitates preventing thermal conductive transfer from the exhaust temperature rake to the fiber optic sensor, and the sheath is constructed of a high-heat conductive material that protects the fiber optic sensor from drag forces while enabling the fiber optic sensor to produce thermally responsive dynamic temperature measurements. As such, the high-heat conductive material is sensitive to changes in gas flow rate and the low-heat conductive material facilitates preventing a thermal heat sink effect from the exhaust temperature rake.

For example, known thermocouples are sealed in a magnesium oxide (MgO) ball and packaged positioned within a nickel-based alloy tube having open ends that are parallel to the flow of gas. The gas flow penetrates the tube and flows past the packaged thermocouple such that the thermocouple can measure dynamic temperature. However, sealing the thermocouple in the MgO ball and alloy tube results in deformation of the flow vortex surrounding the thermocouple. As such, known thermocouples have a thermal response rate of approximately 3° F./second with a 50% response time of 237 seconds and a 90% response time of 440 seconds. Furthermore, such packaged thermocouples have a response frequency in the 1-10 hertz range. The fiber optic sensor package described herein is capable of producing thermal response rates from about 19° F./second to about 350° F./second and response frequencies from about 100 hertz (Hz) to about 1000 Hz.

As such, the fiber optic sensor package described herein facilitates gathering thermally responsive dynamical temperature measurements within a turbine engine. The information gathered by the sensor package facilitates improving prognostic health management of turbine engine components by optimizing turbine operating conditions and efficiency. For example, during startup of a gas turbine, the temperature within the turbine must be monitored to control thermal expansion of hot gas path components. Although it is desirable that startup be accomplished quickly, a balance must be maintained between quickly starting the turbine engine and preventing damage to turbine components from uncontrolled thermal expansion induced stress. As such, the fiber sensor package described herein facilitates determining optimum startup conditions for a turbine engine. Furthermore, for example, information gathered by the fiber sensor package may facilitate determining peak firing conditions of the turbine engine. As such, turbine output and efficiency may be increased, and the lifetime of turbine components may be prolonged.

FIG. 1 is a schematic view of an exemplary turbine engine 100. More specifically, in the exemplary embodiment turbine engine 100 is a gas turbine engine. While the exemplary embodiment illustrates a gas turbine engine, the present invention is not limited to any one particular engine, and one of ordinary skill in the art will appreciate that the sensor package described herein may be used in connection with other turbine engines.

In the exemplary embodiment, turbine engine 100 includes an intake section 112, a compressor section 114 downstream from intake section 112, a combustor section 116 downstream from compressor section 114, a turbine section 118 downstream from combustor section 116, and an exhaust section 120. Turbine section 118 is coupled to compressor section 114 via a rotor shaft 122. In the exemplary embodiment, combustor section 116 includes a plurality of combustors 124. Combustor section 116 is coupled to compressor section 114 such that each combustor 124 is in flow communication with compressor section 114. A fuel nozzle assembly 126 is coupled within each combustor 124. Turbine section 118 is coupled to compressor section 114 and to a load 128 such as, but not limited to, an electrical generator and/or a mechanical drive application through rotor shaft 122. In the exemplary embodiment, each of compressor section 114 and turbine section 118 is coupled to rotor shaft 122.

During operation, intake section 112 channels air towards compressor section 114 wherein the air is compressed to a higher pressure and temperature prior to being discharged towards combustor section 116. The compressed air is mixed with fuel and other fluids provided by each fuel nozzle assembly 126 and then ignited to generate combustion gases that are channeled towards turbine section 118. More specifically, each fuel nozzle assembly 126 injects fuel, such as natural gas and/or fuel oil, air, diluents, and/or inert gases, such as nitrogen gas ($N_2$), into respective combustors 124, and into the air flow. The fuel mixture is ignited to generate high temperature combustion gases that are channeled towards turbine section 118. Turbine section 118 converts the energy from the gas stream to mechanical rotational energy, as the combustion gases impart rotational energy to turbine section 118.

Figure 2:
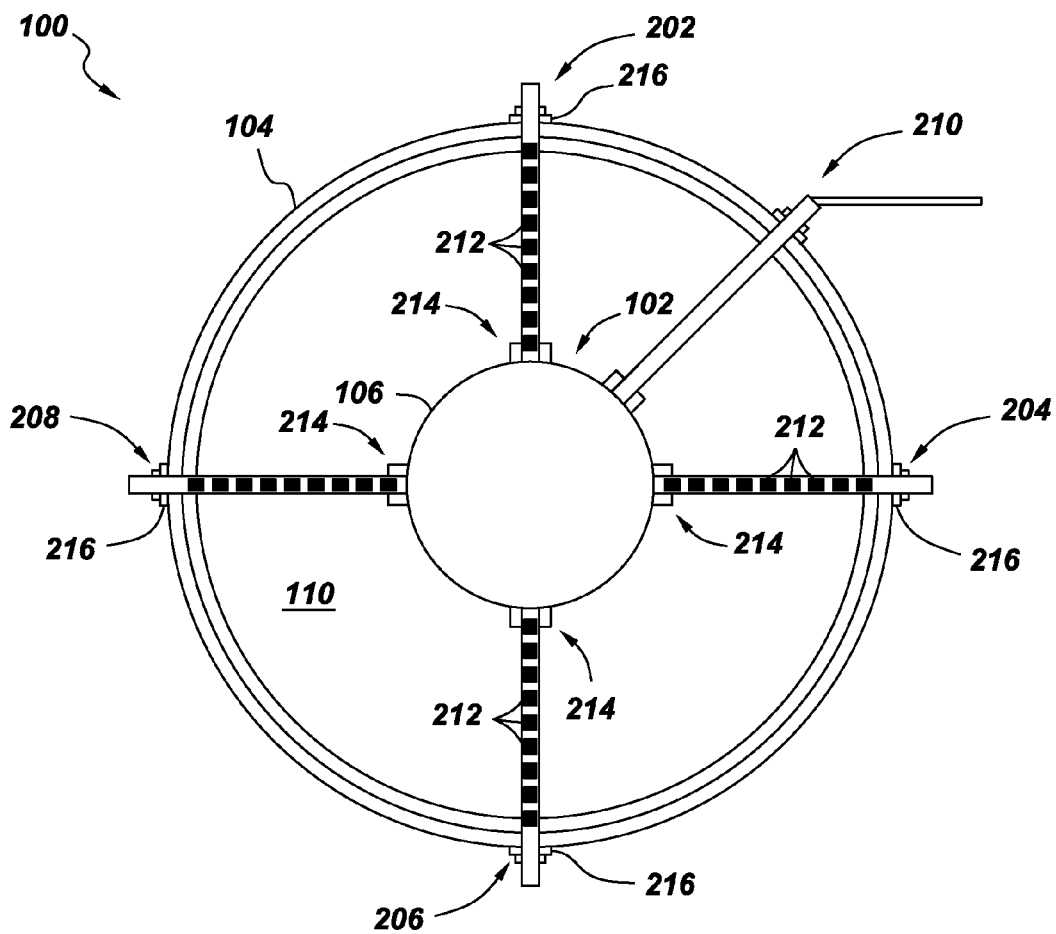
FIG. 2 is a cross-sectional view of the turbine engine shown in FIG. 1 taken along line 2-2.

FIG. 2 is a cross-sectional view of turbine engine 100 taken along line 2-2. In the exemplary embodiment, turbine engine 100 includes an inner hub 102 and an outer shell 104 that substantially circumscribes inner hub 102. Turbine engine 100 also includes a plurality of support structures that extend between outer shell 104 and inner hub 102. For example, in the exemplary embodiment, turbine engine 100 includes a first exhaust temperature rake 202, a second exhaust temperature rake 204, a third exhaust temperature rake 206, and a fourth exhaust temperature rake 208. In one embodiment, exhaust temperature rakes 202, 204, 206, and 208 are inserted through outer shell 104 such that a first end 214 of exhaust temperature rakes 202, 204, 206, and 208 are coupled to an outer surface 106 of inner hub 102. Furthermore, in the exemplary embodiment, exhaust temperature rakes 202, 204, 206, and 208 include a flange 216 coupled to outer shell 104 for sealing outer shell 104 when exhaust temperature rakes 202, 204, 206, and 208 are inserted therethrough.

Although the exemplary embodiment includes four exhaust temperature rakes, it should be understood that any suitable number of exhaust temperature rakes may be used such that turbine engine 100 operates as described herein. For example, in an alternative embodiment, a plurality of exhaust temperature rakes may be positioned radially about the inner hub of a turbine engine such that each exhaust temperature rake is positioned apart from each other at the inner surface of the outer shell.

Furthermore, in the exemplary embodiment, exhaust temperature rake 202 is positioned at the 0° position about inner hub 102 at the top of turbine engine 100, exhaust temperature rake 204 is positioned at the 90° position, exhaust temperature rake 206 is positioned at the 180° position, and exhaust temperature rake 208 is positioned at the 270° position. As such, exhaust temperature rakes 202, 204, 206, and 208 are substantially positioned within a flow path 110 of turbine engine 100 and substantially equally spaced about inner hub 102. However, it should be understood that exhaust temperature rakes 202, 204, 206, and 208 do not need to be equally spaced about inner hub 102. Furthermore, in the exemplary embodiment, turbine engine 100 includes a thermocouple 210 extending from outer shell 104 to inner hub 102 positioned radially between exhaust temperature rakes 202 and 204. Furthermore, as explained in more detail below, a plurality of fiber optic sensors 212 are coupled indirectly to exhaust temperature rakes 202, 204, 206, and 208. As such, the positioning of exhaust temperature rakes 202, 204, 206, and 208 including fiber optic sensors 212 facilitates obtaining circumferential and radial dynamic temperature measurements of flow path 110. While the exemplary embodiment illustrates determining dynamical temperature within flow path 110 of a turbine engine 100, one of ordinary skill in the art will appreciate that the sensor package described herein may be used in any environment that can benefit from responsive dynamical temperature measurements. For example, the sensor package described herein may be positioned either upstream or downstream of turbine section 118 (shown in FIG. 1), or may be positioned within stratification ducts. Furthermore, in the exemplary embodiment, thermocouple 210 measures dynamic temperature within flow path 110 and provides a baseline comparison for dynamic temperature measured by fiber optic sensors 212. In an alternative embodiment, thermocouple sensing ports may be defined within an exhaust temperature rake and used in combination with the sensor package coupled to the exhaust temperature rake.

Figure 3:
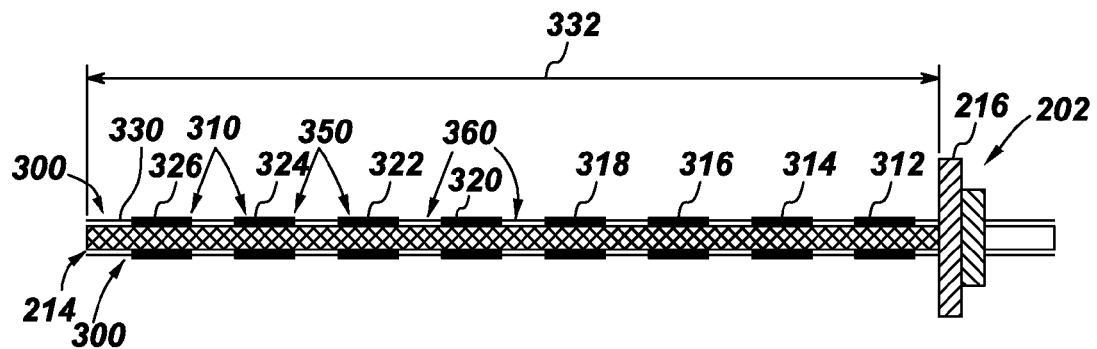
FIG. 3 is a perspective view of an exemplary dynamic fiber temperature sensing package.

FIG. 3 is a perspective view of an exemplary dynamic fiber temperature sensing package 300. In the exemplary embodiment, sensing package 300 is described in combination with exhaust temperature rake 202. However, it should be understood that sensing package 300 may be used in combination with exhaust temperature rakes 202, 204, 206, and 208. Furthermore, by way of example, sensing packages 300 are located on opposing sides of exhaust temperature rake 202. In the exemplary embodiment, sensing package 300 includes a plurality of holder tubes 310, a sheath 330, and a plurality of fiber optic sensors 212 (shown in FIG. 2). More specifically, for example, the plurality of holder tubes 310 include a first holder tube 312, a second holder tube 314, a third holder tube 316, a fourth holder tube 318, a fifth holder tube 320, a sixth holder tube 322, a seventh holder tube 324, and an eighth holder tube 326. Although the exemplary embodiment includes eight holder tubes 310, it should be understood that any suitable number of holder tubes 310 may be used such that sensing package 300 functions as described herein. Furthermore, in the exemplary embodiment, the holder tubes 310 are coupled to an outer surface 220 of exhaust temperature rake 202 (as shown by holder tubes 512 and 514 in FIG. 5, for example).

Moreover, in the exemplary embodiment, holder tubes 310 are constructed of any suitable relatively low-heat conductive material. For example, holder tubes 310 may be constructed of a stainless steel material, a quartz material, a nickel-based alloy material, and any combination thereof. However, it should be understood that holder tubes 310 may be constructed of any material that facilitates preventing thermal conductive transfer between exhaust temperature rake 202 and fiber optic sensors 212. Furthermore, holder tubes 310 are configured to receive sheath 330 inserted therethrough. For example, in the exemplary embodiment, holder tubes 310 are substantially cylindrical hollow tubes constructed of stainless steel having a side wall thickness ranging from about 0.004 inches to about 0.04 inches.

Furthermore, in the exemplary embodiment, sheath 330 is constructed of any suitable high-conductive material. For example, sheath 330 may be constructed of a copper material, an aluminum material, a gold material, a silver material, a platinum material, and any combination thereof. However, it should be understood that sheath 330 may be constructed of any material that enables fiber optic sensors 212 to responsively measure dynamical temperature within turbine engine 100. In the exemplary embodiment, sheath 330 is constructed of an aluminum, copper, and nickel based alloy. Moreover, in the exemplary embodiment, sheath 330 facilitates protecting fiber optic sensors 212 from drag forces induced by fluid flowing through turbine engine 100. As such, sensing package 300 may withstand temperatures of up to approximately 1250° F.

Furthermore, in the exemplary embodiment, sheath 330 is coupled to exhaust temperature rake 202 via holder tubes 310. More specifically, for example, sheath 330 is inserted through holder tubes 310. Furthermore, in the exemplary embodiment, each holder tube 312, 314, 316, 318, 320, 322, 324, and 326 extends only partially along a length 332 of sheath 330. As such, sheath 330 includes a plurality of covered portions 350 and a plurality of exposed portions 360.

Figure 4:
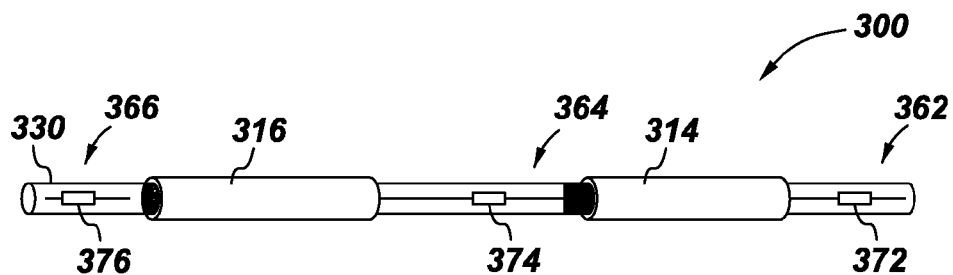
FIG. 4 is an enlarged sectional view of the sensing package shown in FIG. 3.

FIG. 4 is an enlarged sectional view of sensing package 300. In the exemplary embodiment, fiber optic sensors 212 are positioned within sheath 330. More specifically, for example, the plurality of fiber optic sensors 212 includes a first fiber optic sensor 372, a second fiber optic sensor 374, and a third fiber optic sensor 376. In the exemplary embodiment, fiber optic sensor 372 is substantially aligned with an exposed portion 362 between first holder tube 312 (shown in FIG. 3) and second holder tube 314, fiber optic sensor 374 is substantially aligned with an exposed portion 364 between second holder tube 314 and third holder tube 316, and fiber optic sensor 376 is substantially aligned with an exposed portion 366 between third holder tube 316 and fourth holder tube 318 (shown in FIG. 3). Although the exemplary embodiment includes three fiber optic sensors, it should be understood that fiber optic sensors 212 are positioned substantially similarly along length 332 of sheath 330 such that each fiber optic sensor 212 substantially aligns with exposed portions 360. Moreover, in the exemplary embodiment, fiber optic sensors 212 are positioned along length 332 of sheath 330 in about 1 inch to 2 inch intervals. However, it should be understood that fiber optic sensors 212 may be spaced along length 332 at any suitable interval to enable sensing package 300 to function as described herein. As such, each fiber optic sensor 212 is positioned at a different radial position within flow path 110 (shown in FIG. 2) to facilitate determining a radial temperature profile of flow path 110. Furthermore, in the exemplary embodiment, each fiber optic sensor 212 is hermetically sealed within sheath 330.

Figure 5:
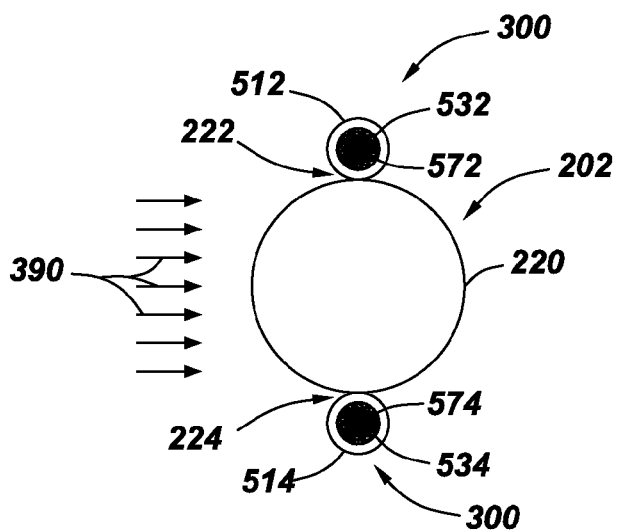
FIG. 5 is a cross-sectional view of the sensing package shown in FIG. 3.

FIG. 5 is a cross-sectional view of sensing package 300. In the exemplary embodiment, sensing packages 300 are positioned such that fluid 390 channeled through flow path 110 substantially contacts sensing packages 300. For example, in the exemplary embodiment, a holder tube 512 is coupled to exhaust temperature rake outer surface 220 on a first side 222 of exhaust temperature rake 202, and a holder tube 514 is coupled to exhaust temperature rake outer surface 220 on a second side 224 of exhaust temperature rake 202. As such, when a sheath 532 is inserted through holder tube 512 and a sheath 534 is inserted through holder tube 514, fluid 390 channeled through flow path 110 substantially contacts fiber optic sensors 572 and 574 to facilitate dynamic temperature measurement. Furthermore, in the exemplary embodiment, exhaust temperature rake 202 extends into flow path 110 such that exhaust temperature rake 202 is substantially perpendicular with respect to fluid 390 flowing through flow path 110.

As mentioned above, sheath 330 enables fiber optic sensors 212 to responsively measure dynamical temperature within turbine engine 100. In the exemplary embodiments, the thermal response rate produced by fiber optic sensors 212 is dependent upon the thermal conductive properties of the material that sheath 330 is constructed from, and it is dependent upon the diameter of sheath 330. Furthermore, the thermal response rate of fiber optic sensors 212 is dependent upon the diameter and construction materials of holder tubes 310. In the exemplary embodiments, for example, when holder tube 310 has a diameter of 0.02 inches and is constructed of a stainless steel material, fiber optic sensors 212 have a thermal response rate of approximately 350° F./second with a 50% response time of 1.0 seconds and a 90% response time of 14.8 seconds. Furthermore, for example, when holder tube 310 has a diameter of 0.04 inches and is constructed of a stainless steel material, fiber optic sensors 212 have a thermal response rate of approximately 100° F./second with a 50% response time of 7 seconds and a 90% response time of 25 seconds. Furthermore, for example, when holder tube 310 has a diameter of 0.25 inches and is constructed of a quartz material, fiber optic sensors 212 have a thermal response rate of approximately 19° F./second with a 50% response time of 36 seconds and a 90% response time of 290 seconds.

As such, while the exemplary embodiment illustrates determining dynamical temperature within a flow path of a turbine engine, one of ordinary skill in the art will appreciate that the sensing package described herein may be used in any environment that can benefit from responsive dynamical temperature measurements. For example, the sensing package described herein facilitates protecting fiber optic sensors from drag forces induced by fluid flowing through a turbine engine while enabling the fiber optic sensors to provide improved thermal response rates. More specifically, the sheath described herein substantially protects the fiber optic sensors from drag forces and the holder tubes facilitate reducing thermal conductive transfer between an exhaust temperature rake and the fiber optic sensors. Furthermore, the holder tubes are coupled to the exhaust temperature rake such that the sheath and fiber optic sensors are coupled to the exhaust temperature rake via the holder tubes. Enabling the fiber optic sensors to produce improved thermal response rates facilitates improving prognostic health management of the turbine engine. As such, efficiency of the turbine engine and life of turbine components are improved, thereby reducing overall costs associated with operation of the turbine engine.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A dynamic fiber temperature sensing package comprising:
   a support structure comprising an exhaust temperature rake;
   a holder coupled to said support structure, said holder including a material having a first thermal conductivity;
   a sheath coupled to the support structure via the holder, said sheath including a material having a second thermal conductivity that is greater than the first thermal conductivity; and
   a fiber optic temperature sensor positioned within said sheath,
   wherein the first thermal conductivity of said holder facilitates preventing conductive heat transfer between said support structure and said fiber optic temperature sensor.

2. The package in accordance with claim 1 further comprising a plurality of fiber optic temperature sensors, wherein each fiber optic temperature sensor is positioned within said sheath and spaced at about one inch to about two inch intervals from each other along a length of said sheath.

3. The package in accordance with claim 2, wherein the sensing package comprises a plurality of holders, each holder extending only partially along a length of said sheath such that said sheath includes a covered portion and an exposed portion.

4. The package in accordance with claim 3, wherein said plurality of fiber optic temperature sensors are aligned with the exposed portions of said sheath.

5. The package in accordance with claim 1, wherein said sheath is constructed of a first material comprising at least one of a copper material, an aluminum material, a gold material, a silver material, a platinum material, a stainless steel material, a quartz material, a nickel-based alloy material, and combinations thereof.

6. The package in accordance with claim 1, wherein said holder is constructed of a second material comprising at least one of a stainless steel material, a quartz material, a nickel-based alloy material, and combinations thereof.

7. The package in accordance with claim 1, wherein said holder comprises a tube, wherein said sheath is inserted through said tube.

8. A turbine assembly comprising:
   a turbine including an exhaust flow path and a shell;
   a support structure extending substantially into the exhaust flow path;
   a holder coupled to said support structure, said holder including a material having a first thermal conductivity;
   a sheath coupled to the support structure via the holder, said sheath including a material having a second thermal conductivity that is greater than the first thermal conductivity; and
   a fiber optic temperature sensor positioned within said sheath for sensing a temperature of the exhaust flow path,
   wherein the first thermal conductivity of said holder facilitates preventing conductive heat transfer between said support structure and said fiber optic temperature sensor during operation.

9. The turbine assembly in accordance with claim 8, wherein said fiber optic temperature sensor facilitates determining a radial temperature profile of the flow path by extending substantially radially from the shell to an inner hub.

10. The turbine assembly in accordance with claim 8, wherein the turbine assembly comprises a plurality of fiber optic temperature sensors, each fiber optic temperature sensor positioned at different radial positions within the flow path.

11. The turbine assembly in accordance with claim 8, wherein the second thermal conductivity of said sheath facilitates enabling said fiber optic temperature sensor to have a thermal response rate that is higher than approximately 10° F./second.

12. The turbine assembly in accordance with claim 11, wherein the thermal response rate of said fiber optic temperature sensor is between about 19° F./second to about 350° F./second.

13. The turbine assembly in accordance with claim 8, wherein said fiber optic temperature sensor is sealed within said sheath to protect said fiber optic temperature sensor from a drag force induced by fluid that flows through the turbine assembly.

14. The turbine assembly in accordance with claim 8, wherein said support structure comprises an exhaust temperature rake extending substantially perpendicular with respect to the exhaust flow path.

15. The turbine assembly in accordance with claim 8, wherein the holder extends only partially along a length of the sheath such that the sheath includes a first portion covered by the holder and a second adjacent portion not covered by the holder.

16. The turbine assembly in accordance with claim 15, wherein said fiber optic temperature sensor is aligned with the second adjacent portion of the sheath not covered by the holder.

17. The turbine assembly in accordance with claim 8, wherein said holder further comprises a plurality of holders coupled to the support structure such that each holder is spaced along a length of the sheath.

* * * * *